United States Patent

[11] 3,594,501

[72] Inventors Boleslaw Marian Sosin
Essex, England;
Alec J. Prime, New South Wales, Australia
[21] Appl. No. 745,856
[22] Filed July 18, 1968
[45] Patented July 20, 1971
[73] Assignee The Marconi Company Limited
London, England
[32] Priority July 19, 1967
[33] Great Britain
[31] 33,136/68

[54] SELECTIVE MULTIPLE PAIR FREQUENCY SHIFT TELEGRAPH ENCODER

9 Claims, 6 Drawing Figs.

[52] U.S. Cl. .......... 178/66, 325/163
[51] Int. Cl. .......... H04l 27/00
[50] Field of Search .......... 178/66, 67, 68, 88; 325/30, 163; 331/179

[56] References Cited

UNITED STATES PATENTS

| | | | |
|---|---|---|---|
| 3,102,238 | 8/1963 | Bosen .......... | 325/163 |
| 3,205,441 | 9/1965 | Likel .......... | 325/163 |

*Primary Examiner*—Robert L. Griffin
*Assistant Examiner*—Albert J. Mayer
*Attorney*—Baldwin, Wight & Brown

ABSTRACT: In a frequency shift telegraph system any pair of a number of pairs of frequency values is derived from a single-master oscillation source. Oscillations from the source are divided and combined in pairs so as to produce, on selection, equal multiples of the required "mark" and "space" frequencies. A keying arrangement determines when the "mark" and "space" frequencies are produced, and a frequency divider converts the frequencies to the desired values.

Figure 1:
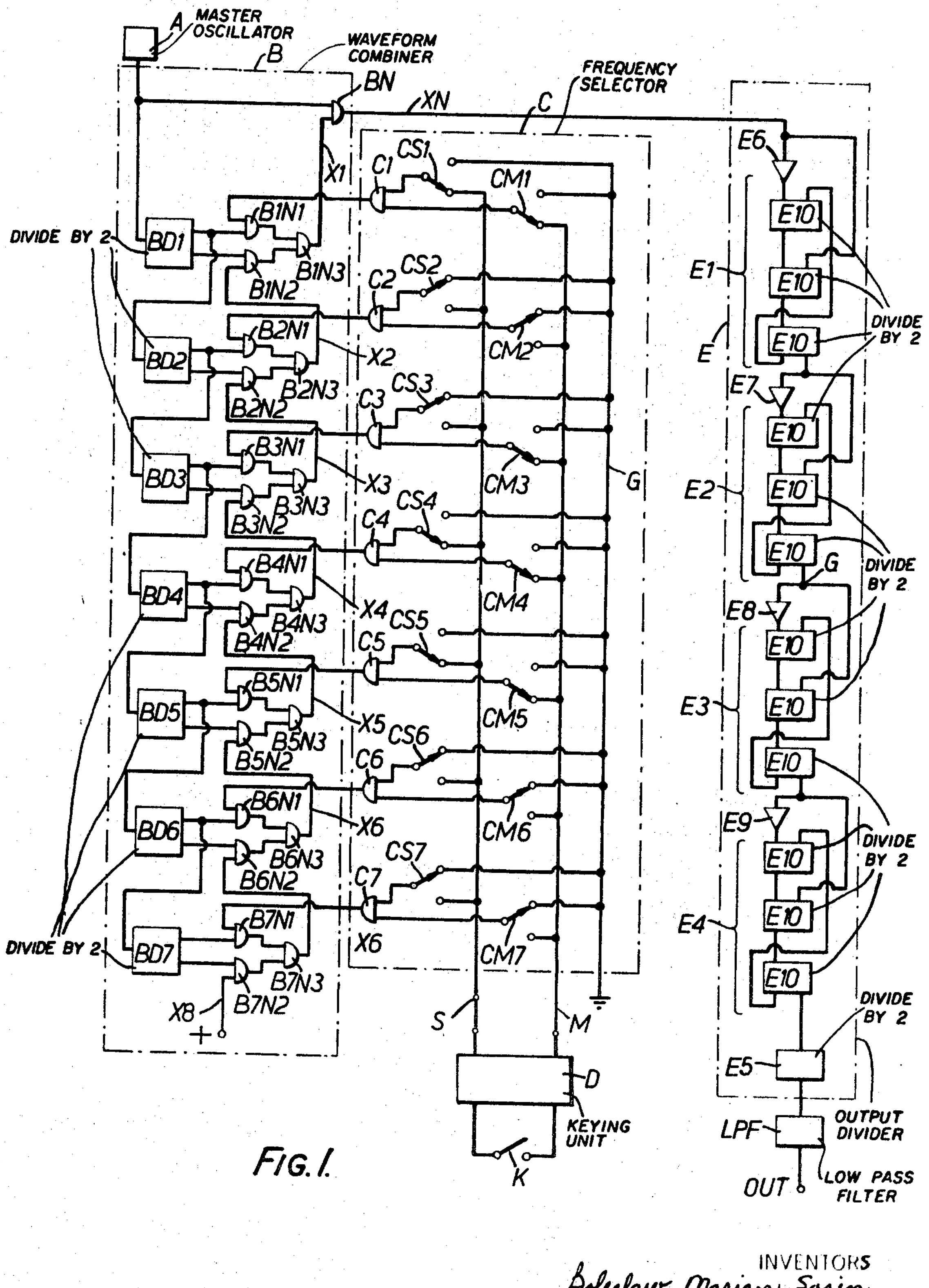

INVENTORS
Boleslaw Marian Sosin and Alec James Prime
BY Baldwin Wight Diller & Brown ATTORNEYS INVENTORS
Boleslaw Marian Sosin
and
Alec James Prime
BY Baldwin Wight Diller & Brown ATTORNEYS INVENTORS
Boleslaw Marian Sosin
and
Alec James Prime
BY Baldwin Wight Diller & Brown ATTORNEYS

INVENTORS

Boleslaw Marian Sosin and Alec James Prime

BY Baldwin Wight Diller & Brown ATTORNEYS

SELECTIVE MULTIPLE PAIR FREQUENCY SHIFT TELEGRAPH ENCODER

This invention relates to frequency shift telegraph systems, an expression which is used in this specification in a wide sense to include all systems in which different signal elements are characterized by and transmitted as different predetermined frequencies. The expression "frequency shift telegraph system" as used herein therefore includes what are more generally known as voice frequency telegraph systems.

Frequency shift telegraphy is widely used for communication over radio links and lines. For satisfactory operation it is necessary that the frequencies employed, which may be termed the "mark" frequency and the "space" frequency, must be stable and shifting from one to another must be accomplished without phase or amplitude discontinuities, especially in the case of high-speed telegraphy. If these requirements are not satisfied telegraphic errors are likely to occur.

These requirements are quite difficult to satisfy. The well-known expedient of obtaining frequency stability by using two highly stable fixed frequency oscillators, one for the mark frequency and the other for the space frequency, and keying between them, is not satisfactory because phase discontinuities occur when keying from one to the other. For this reason a single oscillator the frequency of which is changed from the mark value to the space value by keying is often used. A system of this nature is inherently less stable in frequency than one using two fixed frequency oscillators. Moreover, unless careful and expensive precautions are taken, amplitude and/or phase discontinuities (commonly both) still occur.

Another difficulty which arises in connection with modern frequency shift telegraphy is that international regulations specify and limit the band width which is permitted to be occupied by the transmitted signals and, with known frequency shift telegraph systems as at present in general use, the satisfaction of this requirement involves the provision of expensive so-called "curbing" filters to eliminate or reduce to acceptable levels frequencies lying outside the permitted band.

The present invention seeks to provide improved frequency shift telegraph systems in which the required frequencies are obtained from a single-stable oscillator without amplitude or phase discontinuities. In its preferred embodiments the invention enables compliance with the international regulations as respects permissible bandwidth to be achieved without the use of curbing filters.

According to this invention a frequency shift telegraph system comprises a relatively high frequency stable master source of substantially rectangular waveform oscillations; means for frequency dividing oscillations from said source to produce a plurality of divided frequency rectangular waves of different predetermined frequencies; a combiner adapted to add two different selected combinations of the divided frequency rectangular waves to produce one or other of a pair of rectangular waves having frequencies which are the same multiple of the desired mark and space frequencies respectively; means controlled by a keying waveform for controlling said combiner to produce one of said pair of waves in the mark condition of telegraphy and the other of said pair of waves in the space condition of telegraphy; and an output frequency divider fed from the combiner and having a factor of division equal to the value of said multiple.

Preferably the frequencies of the waves of the pair are equally spaced on either side of a central frequency which is in integral relationship with the frequency of the master source.

Preferably the combiner is adapted to add a multiple of two different selected combinations of the divided frequency rectangular waves to produce any of a plurality of pairs of waves, the frequencies of the waves of each pair being centered on a common central frequency in integral relationship with the frequency of the master source, and switch means are provided for selecting any desired one of said pairs, the means controlled by the keying waveform being arranged to control the combiner to produce, in the mark condition of telegraphy, one wave of the selected pair and, in the space condition of telegraphy, the other wave of the selected pair, whereby frequency shift telegraphy on any one of a plurality of selectable pairs of frequencies is obtained.

Preferably the means for frequency dividing the oscillations from the master source comprise a cascaded series of divide-by-two dividers.

Preferably also the output frequency divider comprises a plurality of divide-by-two dividers and terminates in a divide-by-two divider.

Preferably the addition of the different selected combinations of the divided frequency rectangular waves is effected by a plurality of logic circuits including each a set of gates, each set receiving an input of a different divided frequency rectangular wave and an input controlled by the keying waveform, each set, except the one which receives an input of the divided frequency rectangular wave of lowest frequency, receiving also output from the set which receives an input of the divided frequency rectangular wave of frequency next lower than the one which it receives itself.

Preferably the output from the output divider is passed through a low-pass filter having a cutoff frequency which is above the highest output frequency the system is designed to provide and is substantially below twice said highest frequency.

Preferably also means are provided for producing between each mark frequency transmission and the next space frequency transmission, and vice versa, at least one cycle of an intermediate frequency which is in phase continuity with the mark and space frequencies and is preferably equal to the arithmetic mean of these two frequencies. One way of deriving this intermediate frequency is by using a waveform taken from the output divider and the keying waveform jointly to control the production of the required intermediate frequency at the required times by the combiner which is arranged to produce by addition three different predetermined frequencies integrally related respectively to the mark frequency, the intermediate frequency and the space frequency, the frequency produced at any time being determined jointly by the keying waveform and the waveform taken from the output divider. In another way of deriving this intermediate frequency the combiner is arranged to produce by addition two different predetermined frequencies integrally related to the mark and space frequencies respectively and control exercised jointly by the keying waveform and by a relatively high frequency derived from the output divider is employed in effect to switch over the combiner at the required times, to alternate at said relatively high frequency and for equal short periods between production of one of said two predetermined frequencies and production of the other. This rapid effective symmetrical alternation of the combiner at relatively high frequency between the two frequencies which it can produce by addition gives the same effect, while said alternation is occurring, as would be obtained were the combiner arranged to produce a third (intermediate) frequency by addition during the periods of alternation.

Figure 2:
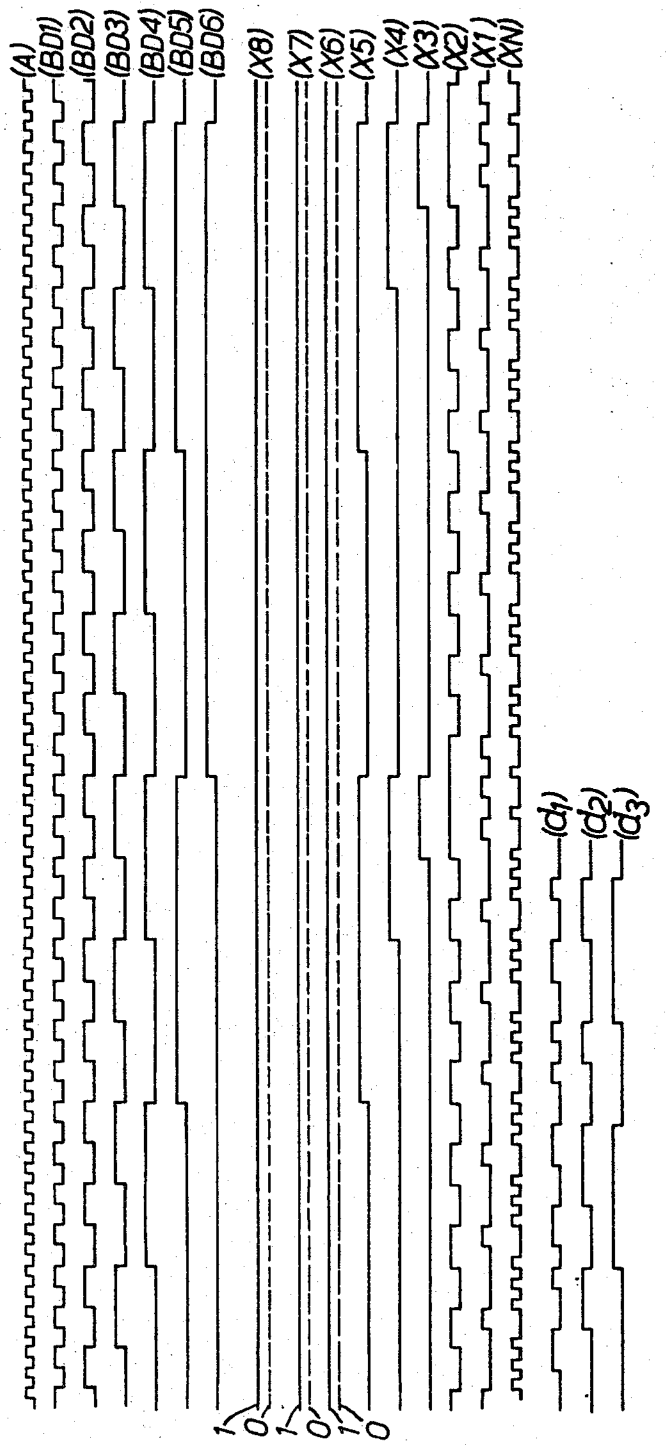
Figure 3:
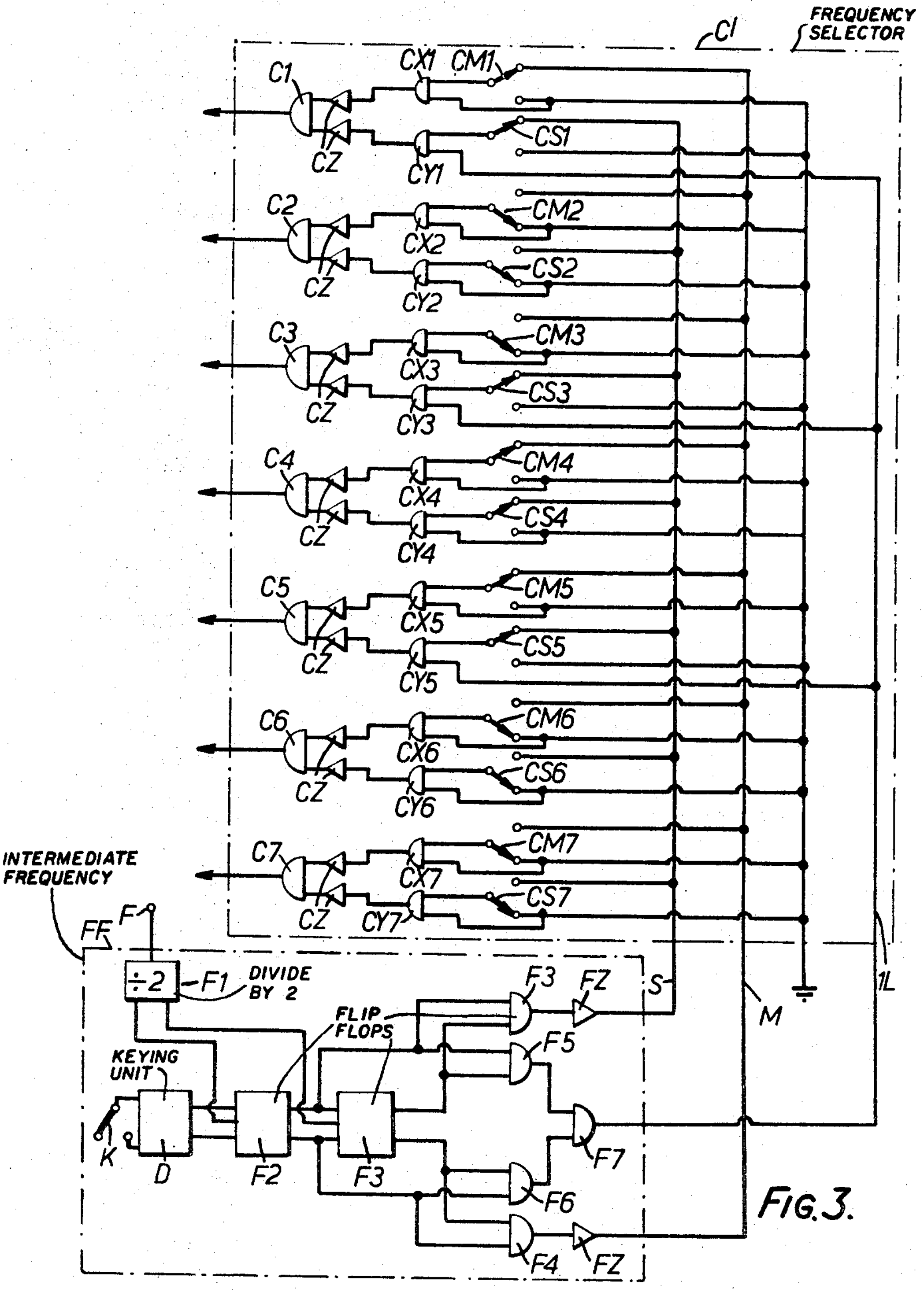
Figure 4:
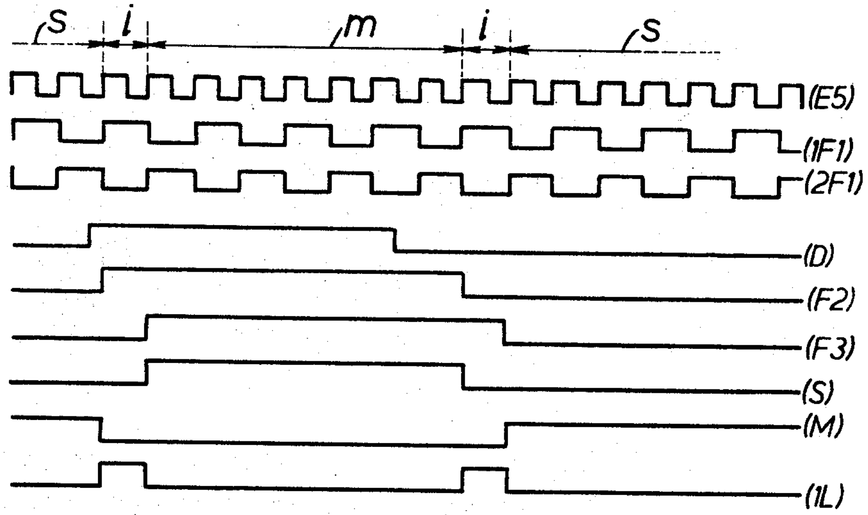
Figure 5:
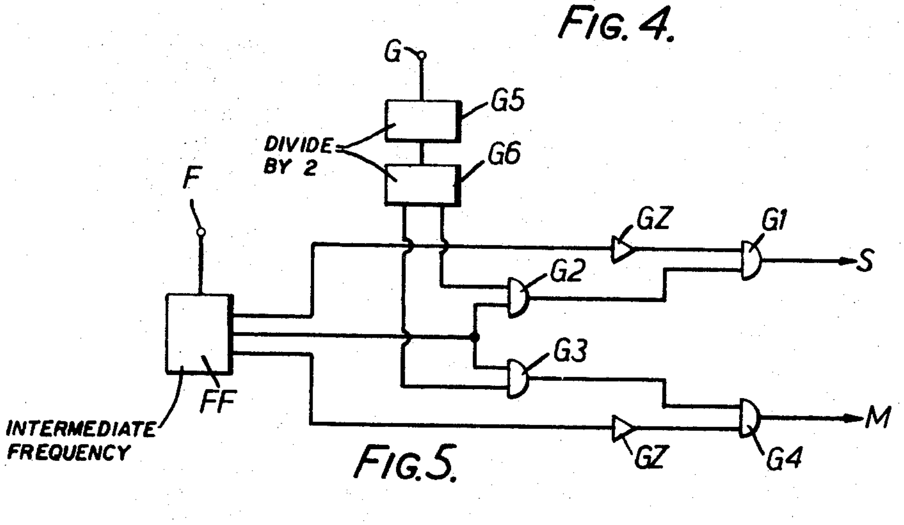
Figure 6:
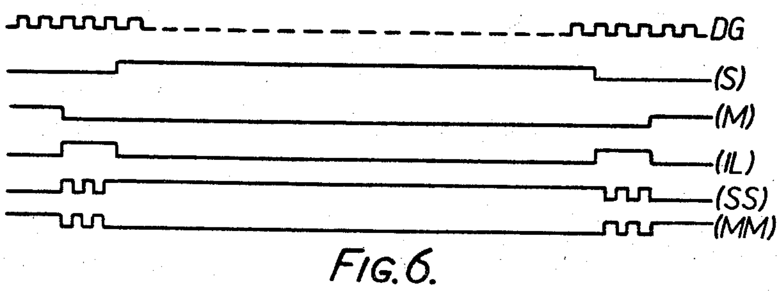

The invention is illustrated in and further explained in connection with the accompanying drawings in which FIG. 1 is a simplified block diagram of one embodiment showing the same to the extent necessary to an understanding thereof;

FIG. 2 is a set of waveforms explanatory of the operation of the embodiment of FIG. 1;

FIG. 3 and 5 show, so far as is necessary to an understanding thereof, two modifications; and FIGS. 4 and 6 are explanatory waveform diagrams related respectively to the embodiments of FIGS. 3 and 5.

In describing the embodiment of FIG. 1 and its operation certain practical values of frequency will be given but it is to be understood that they are by way of example and in no sense limiting. Also, in the description in question it will be assumed that a positive voltage or a positive excursion of a waveform corresponds to a "1" in digital signal parlance; and that earth potential or a negative waveform excursion corresponds to a "0." This assumption is made, however, merely to simplify description and is, of course, not necessarily true.

The apparatus shown in FIG. 1 is designed to provide frequency shift telegraphy using any of a plurality of selectable pairs of frequencies, one of each pair to correspond with "-mark" and the other to correspond with "space." All the pairs are center on the same midfrequency value which, in the example now to be described, is 4,200 c./s. The particular frequency pairs, any of which can be at will selected for frequency shift telegraph are four in number namely:

4,200 ± 50 c./s.

4,200 ± 100 c./s.

4,200 ± 200 c./s. and 4,200 ± 400 c./s.

As will be apparent later whichever pair of frequencies may be selected for use, the frequencies in question are obtained by derivation from one and the same continuously running master oscillation source in a digital manner which is such that their stability is determined solely by that of said master oscillator source (which is of high stability), frequency shift from one frequency to the other of a pair being achieved without amplitude or phase discontinuity.

The embodiment of FIG. 1 consists of five main assemblies of parts which are designated by letter references and, in the cases of the assemblies B, C and E are indicated by chain line blocks. These assemblies are: the master oscillation source A; what is herein termed a waveform combiner B which derives certain waveforms from the output of the source A and combines them in controllable manner to produce any of a plurality of pairs of frequencies all centered on a central frequency and all (including said central frequency) being much higher than the pairs of frequencies which are to be used to represent "mark" and "space" respectively in the telegraph message; a frequency selector C which can be preset to determine which of the pairs of frequencies the combiner B is capable of producing is actually selected for production thereby; a keying unit D which is controlled by a key K or by an input keying waveform derived in any manner, and which, operating through the circuits of the selector C, causes the combiner B to produce one frequency of the selected produced pair of frequencies when the key or keying waveform is at "mark" and the other frequency of said selected pair when said key or keying waveform is at "space;" and a large ratio output divider E which includes divide-by-two dividers and produces, from the produced outputs from B, the much lower pair of frequencies which are required to represent "mark" and "-space" in the actual telegraph message.

The master oscillation source A, which is represented simply by the block referenced A, is a square wave source having a frequency, in the example now being described, of 8 mc./s. It may in practice be constituted by a crystal controlled high-stability oscillator in accordance with a shaping network which produces, from the oscillator, output, the required square wave. This square wave output, which is represented by line (A) of FIG. 2, is fed to the combiner B which includes a chain of seven divide-by-two dividers BD1 BD2 BD3...BD7.

Each of these dividers has two output leads on which appear, respectively, two outputs consisting of two waveforms of opposite instantaneous polarities but otherwise alike. The output waveform appearing on the upper (in FIG. 1) output lead of each divider (except divider BD7) is fed as input to the next divider so that the waveforms appearing on each of these upper leads (except the first) has a frequency which is half that on the upper lead of the preceding divider, the output on the upper lead of the first divider being half the frequency from the square wave source A. The waveforms on the upper output leads of the dividers BD1, BD2.......BD7 are represented respectively in the lines referenced BD1, BD2....... BD7 of FIG. 2 and are of frequencies 4 mc./s., 2mc./s.—0.0625 mc./s. respectively. The waveforms on the lower output leads of the dividers are not shown in FIG. 2 but, in each case it is the "mirror image" of the waveform on the corresponding upper output lead.

Each of the dividers has associated therewith a combination of three NOR gates. The expression NOR gate is here used with its normal significance in digital signal terminology to mean a gate with two inputs and one output and which provides a "1" output if, and only if, neither input has a "1" thereon. The three NOR gates associated with divider BD1 are referenced B1N1, B1N2 and B1N3, those associated with divider BD2 are referenced B2N1, B2N2 and B2N3...and so on. Starting first with the set of NOR gates B7N1, B7N2 and B7N3 it will be seen that B7N1 has one input fed from the upper output lead of BD7 and the other fed, in manner to be described below, from the selector C; B7N2 has one input fed from the lower output lead of BD7 and the other with a permanent "1" applied to the lead X8 from a positive potential source as indicated; and B7N3 has its two inputs fed from the two outputs of B7N1 and B7N2. The output from B7N3 is fed to that input of B6N2 corresponding to that input of B7N2 to which a permanent "1" is applied, but, except for this, the connection of the set of gates B6N1, B6N2 and B6N3 correspond with those of the set of gates B7N1, B7N2 and B7N3. The other sets of gates are connected in similar fashion, one input to each of the gates BN5N2, BN4N2...BN1N2 being supplied from the output of the gate BN6N3, BN5N3...BN1N 3 in the next lower set and each of the gates B1N1, B2N1...having one input supplied from the selector C. The output from the gate B1B3 constitutes one input to a further NOR gate BN the second input to which is taken from the master oscillation source A.

The above mentioned inputs, supplied from the selector C, to the gates B1N1, B2N1...B7N1 in the combiner B, are taken from the outputs of NOR gates C1, C2...C7 in the selector. Each has two inputs fed through leads in each of which is a two-position switch. The switches in the leads to the upper inputs (in the figure) are referenced CM1, CM2...CM7 and those in the leads to the lower inputs are referenced CS1, CS2...CS7. In practice removable links are used in place of switches but it is more convenient for explanation purposes to show them as switches and to consider them as such. When any of these switches is in its upper position (in the figure) it connects the NOR gate input with which it is in circuit to a grounded line G. When any of the switches CM1 to CM7 is in its lower position (in the figure) it connects the NOR gate input with which it is in circuit to what is herein termed a "-Mark" line M. When any of the switches CS1 to CS7 is in its lower position it connects the NOR gate input with which it is in circuit to what is herein termed a "space" line S. The keying unit D puts a "1" on line M for a mark and a "1" on line S for a space. The frequency of the output from the NOR gate BN obtained during mark is determined (as will be seen later) by the particular switches CM1 to CM7 which are moved to their lower positions and the frequency of the output from the said NOR gate BN during space is similarly determined by the particular switches CS1 to CS7 which are put in their lower positions. The output frequencies from the said gate BN will be much higher than those required for transmission on mark and space and, as will again be seen later, the pulses in their waveforms have undesirable irregularities of occurrence. These irregularities are removed by deriving the actual mark and space frequencies from the output frequencies from BN by means of an output frequency divider E of high ratio—in the present case having a division factor of 1,250—which includes and ends in a divide-by-two divider.

Referring again to FIG. 1 the output divider E comprises in effect four dividing sections indicated by the brackets E1 to E4 and a final divide-by-two divider E5. Each section is preceded by an inverter E6, E7, E8 or E9, and includes three divide-by-two dividers all of which have been given the same reference E10 in FIG. 1. The three divide-by-two dividers E10 in each section are interconnected as shown and as well known per se in such manner that the overall division factor of each dividing section is 5. Accordingly the overall division factor of the whole divider c./s. 5×5×5×5×2=1250. The dividend output is passed through a simple low-pass filter LPF passing all frequencies below about 6 kc./s. to the output terminal OUT. In the particular embodiment now being described the highest output frequency ever required from the divider E is 4.2 kc./s. + 400 c./s. = 4.6 kc./s. The purpose of the filter LPF is to stop the passage of unwanted second and higher harmonics.

The easiest way to appreciate the operation of the embodiment of FIG. 1 is to consider a numerical example. Suppose it is required to obtain mark and space frequencies of 4,200 ±400 c./s. i.e. 4,600 c./s. for mark and 3,800 c./s. for space. To obtain these frequencies the switches CM1 to CM7 and CS1 to CS7 are put into the positions shown in FIG. 1. There will now be described, with reference to FIG. 2, how the mark frequency of 4,600 c./s. is obtained with the switches CM1 to CM7 in the positions shown. As already stated the frequencies of the waveforms in the lines A, BD1, BD2...BD7 are, respectively, 8, 4, 2, 1, 0.5, 0.25, 0.125, and 0.625 mc./s. respectively and a selected additive combination of these frequencies, determined by the setting of the switches CM1 to CM7 is obtained to produce from the selector B, a frequency which, when divided by 1,250 (by the output divider E) is the required mark frequency of 4,600 c./s.

The continuous "1" at the lower input of NOR gate B7N2 on the lead X8 is represented in line X of FIG. 2 and the output on lead X7 from NOR gate B7N3 is shown by line X7 of FIG. 2. Similarly the successive additive outputs on output leads X6, X5, X4, X3, X2, X1 and XN from NOR gates B6N3, B5N3, B4N3, B3N3, B2N3, B1N3 and BN respectively are represented in the lines marked X6, X5, X4, X3, X2, X1 and XN respectively in FIG. 2. As will be seen from line XN of FIG. 2, the frequency here is 5.75 mc./s. which, divided by 1,250, is the required mark frequency of 4,600 c./s. and is obtained each time a "1" is on the mark line M. It will be seen that, with the switches CS1 to CS7 in the positions shown, an output of 3,800 c./s. is obtained at OUT each time the keying waveform is at space.

It will be observed from line XN of FIG. 2, that the output from the NOR gate BN is not regular, the intervals between successive pulses lacking uniformity over the whole waveform. This is, of course, undesirable but it is removed by the action of the divide-by-two dividers in the output divider E. This is illustrated, sufficiently for the action to be understood, from the remainder of FIG. 2 line $d_1$ of which shows part of the waveform of line XN after it has passed through a divide-by-two divider; line $d_2$ of which shows the waveform of $d_1$ after passage through a divide-by-two divider; and line $d_3$ of which shows the waveform of $d_2$ after passage through a divide-by-two divider. A comparison of these four lines XN, $d_1$, $d_2$ and $d_3$ shows at a glance how each successive division by two improves the pulse regularity and it will accordingly be appreciated that the final pulsed waveforms at the output terminal are of a high degree of pulse regularity.

The "logic" circuitry of FIG. 1 is based on use of NOR gates. As will be apparent the necessary waveform additions for producing the frequencies fed to the output divider E can be achieved by other forms of logic circuits, for example circuits using NAND gates instead of using NOR gates. As other forms of logic circuits capable of performing the additions performed by the particular circuits shown in FIG. 1 and achieving the same results are well known per se and will readily suggest themselves to those skilled in the art it is not thought necessary to describe or show such other circuitry herein.

In practice the changeover or keying frequency from mark to space and vice versa is at a comparatively high frequency, 100 c./s. being a practical figure. Such rapid keying of course tends to produce undesired sideband frequencies which widen the frequency spectrum occupied by the transmission as compared with that which would obtain if the action hereinbefore described were performed in an "ideal" manner with no sideband production. This undesired widening of the occupied spectrum can be eliminated or reduced, as known per se, by the use of a so-called "curbing" filter i.e. a filter which is frequency selective and has an attenuation-frequency characteristic designed to differentiate against the sideband frequencies and reduce them to a negligibly small amplitude. However such filters are expensive and difficult to design. FIG. 3 shows, so far as is necessary to an understanding thereof, a modified embodiment in which undesired sideband frequencies due to high-speed keying are much reduced without the need for curbing filters.

Referring to FIG. 3 this shows a selector C′ which is employed in this embodiment in substitution for the selector C of FIG. 1. The NOR gates C1 to C7 in this selector correspond with the similarly referenced NOR gates of FIG. 1 and are connected to the combiner (not shown in FIG. 3) in the same way. Each of these NOR gates has its two input leads connected through inverters CZ to the output leads of a pair of NOR gates CX1, CY; CX2, CY;...CX7, CY7. One input lead of each of the NOR gates CX1 to CX7 is connected through one of the two-position switches CM1 to CM7, when that switch is in its upper position (in the figure), to the "mark" line M. When that switch is in its lower position it connects the input lead in question to earth. The other input leads of said NOR gates CX1 to CX7 are all earthed. Similarly one input lead of each of the NOR gates CY1 to CY7 is connected through one of the two-position switches CS1 to CS7 when that switch is in its upper position, to the "space" line S and when that switch is in its lower position the input lead in question is earthed. The other input leads of the NOR gates CY1, CY3 and CY5 are connected to a third line hereinafter called the "intermediate" line IL. The other input leads of the remaining NOR gates CY2, CY4, CY6 and CY7 are earthed.

Output from the last divider E5 in the output divider E of FIG. 1 is fed from a terminal F to a divide-by-two divider F1 the two opposite polarities outputs from which are fed to one or other of two so-called J-K flip-flops F2 and F3 the former of which has its two output leads feeding into the latter as shown. The two input leads to F2 are fed from the keying unit D which corresponds with the similarly referenced unit D of FIG. 1. The two output leads of F2 also provide one input to each of two NAND gates F3 and F4 the second inputs to which are supplied by the output leads of F3. The term NAND gate is used with its customary significance to mean a gate which gives a "0" output only if both its inputs have a "1" thereon. In addition the two output leads of F2 provide one input to each of two AND gates F5 and F6 the second inputs to which are supplied by the output leads of F3. The term AND gate is also employed with its customary significance and means a gate which gives a "1" output only if both its inputs has a "1" thereon. A NAND gate is thus the opposite of an AND gate. The outputs of the NAND gates are fed through one or other of two inverters both referenced FZ to the "-space" and "mark" lines S and M respectively. The outputs from the two AND gates F5 and F6 constitute the inputs to a NOR gate F7 the output to which is fed to the "intermediate" line IL.

With this arrangement an intermediate frequency is produced between each transmission of the chosen mark frequency and the next transmission of the chosen space frequency, this intermediate frequency being the arithmetic mean of the mark and space frequencies and being produced without phase or amplitude discontinuity. In the present case the intermediate frequency is 42,000 c./s. i.e. the arithmetic mean of 46,000 c./s. and 38,000 c./s. In this way undesired widening of the spectrum caused by high-speed keying, is avoided. FIG. 4 will assist in an understanding of the way in which the intermediate frequency is produced.

Referring to FIG. 4 line E5 shows the waveform taken from the output of E5 of FIG. 1. During "mark" this will be 4,600 c./s. Lines 1F1 and 2F1 show the waveforms on the two output leads of the divider F1. A portion of the keying waveform output from the keying unit D is shown at line D of FIG. 4. The outputs from the J–K flip-flops are shown at F2 and F3 respectively of FIG. 4 and the resulting outputs from the NAND gates F3 and F4, after inversion by the inverters FZ are shown at S and M respectively. The "intermediate" output wave form fed out from the NOR gate F7 to the intermediate line IL is shown at IL in FIG. 4. It will be seen, therefore, that after the end of a mark transmission there is obtained in phase continuity with the output from E5 a cycle at 4,200 c./s. (this frequency being obtained due to the setting of the gates CY1, CY3 and CY5). The times during which the frequencies of 3,800 c./s. (space) 4,200 c./s. (intermediate) and 4,600 c/s (mark) are indicated over line E5 of FIG. 4 by the periods indicated by the letters *s i* and *in* respectively. The arrangement shown in FIG. 3 provides one cycle of the intermediate frequency between mark and space and between space and mark. Obviously, if desired, two (or more) cycles of phase continuous intermediate frequency could be obtained by providing one (or more) additional divide-by-two dividers in cascade with the divider F1 between the terminal F and the two JK flip-flops F2 and F3.

FIG. 5 shows another and preferred way of obtaining the intermediate frequency at the required times. The small block FF of FIG. 5 contains the same apparatus connected in the same way as is shown in the chain line block FF of FIG. 3. The three outputs from the unit FF are taken, one through an inverter GZ to one input of a NAND gate G1; the second to two inputs, one in each, of two NAND gates G2 and G3; and a third through an inverter also referenced GZ to one input of a further NAND gate G4. The output from the combiner C of FIG. 1, after division by 25 in the output divider E of FIG. 1—i.e. output from the point in the divider E marked G in FIG. 1—is fed from terminal G (FIG. 5) to two divide-by-two dividers G5 G6 in cascade and the opposite polarity outputs from C6 provide the second inputs to the NAND gates G2 and G3. The outputs from these gates provide the second inputs to the NAND gates G1 and G4 the outputs from which are taken to the lines S and M respectively of FIG. 1. Comparing the apparatus shown within the block FF of FIG. 3 with the circuit of FIG. 5 it will be seen that the lead to one input of the NAND gate G1 contains two inverters (FZ and GZ) in series as does the lead to one input of the NAND gate C4. The circuit is shown in this way for simplicity of drawing. In practice, of course, two inverters in series would not be used and the inverters FZ and GZ in the leads in question to the gates G1 and G4 would be omitted.

The principal waveforms obtained with the embodiment of FIG. 5 are shown in FIG. 6. Here line DG represents the output from the divider G6. For obvious reasons of drawing the time scale in line DG is somewhat about 10 times too long i.e. the number of pulses per unit time is about 10 times that indicated in the figure. The waveforms at lines S, M and IL are the same as those shown in lines S, M and IL respectively of FIG. 4 and appear at the three output leads of the unit FF. As will be seen the combination of NAND gates of FIG. 5 produces, from these four waveforms (DG, S, M and IL of FIG. 6) the waveform SS as the output from the NAND gate G1 and the waveform MM as the output from the NAND gate G4. These outputs are applied respectively to the lines S and M of a combiner C which is as shown in the block C of FIG. 1.

The embodiment of FIG. 5 has the advantage of simplicity over that of FIG. 3, the number of switches in the combiner being considerably less.

We claim:

1. A frequency shift telegraph system comprising a relatively high frequency stable master source of substantially rectangular waveform oscillations; means for frequency dividing oscillations from said source to produce a plurality of divided frequency rectangular waves of different predetermined frequencies; a combiner adapted to combine two different selected combinations of the divided frequency rectangular waves to produce any of a plurality of pairs of waves having frequencies which are the same multiple of the desired mark and space frequencies respectively, the combination being selected from one of a plurality of possible combinations to produce any of a plurality of pairs of waves, the frequencies of the waves of each pair being centered on a common central frequency in integral relationship with the frequency of the master source; switch means controlled by a keying waveform for controlling said combiner to produce one of said pair of waves in the mark condition of telegraphy and the other of said pair of waves in the space condition of telegraphy whereby frequency shift telegraphy on any one of a plurality of selectable pairs of frequencies is obtained; and an output frequency divider fed from the combiner and having a factor of division equal to the value of said multiple.

2. A system as claimed in claim 1 wherein the means for frequency dividing the oscillations from the master source comprise a cascaded series of divide-by-two dividers.

3. A system as claimed in claim 1 wherein the output frequency divider comprises a plurality of divide-by-two dividers and terminates in a divide-by-two divider.

4. A system as claimed in claim 1 wherein the addition of the different selected combinations of the divided frequency rectangular waves is effected by a plurality of logic circuits including each a set of gates, each set receiving an input of a different divided frequency rectangular wave and an input controlled by the keying waveform, each set, except the one which receives an input of the divided frequency rectangular wave of lowest frequency, receiving also output from the set which receives an input of the divided frequency rectangular wave of frequency next lower than the one which it receives itself.

5. A system as claimed in claim 1 wherein the output from the output divider is passed through a low-pass filter having a cutoff frequency which is above the highest output frequency the system is designed to provide and is substantially below twice said highest frequency.

6. A system as claimed in claim 1 wherein means are provided for producing between each mark frequency transmission and the next space frequency transmission, and vice versa, at least one cycle of an intermediate frequency which is in phase continuity with the mark and space frequencies.

7. A system as claimed in claim 6 wherein the intermediate frequency is equal to the arithmetic means of the mark and space frequencies.

8. A system as claimed in claim 6 wherein the intermediate frequency is derived by using a waveform taken from the output divider and the keying waveform jointly to control the production of the required intermediate frequency at the required times by the combiner which is arranged to produce by addition three different predetermined frequencies integrally related respectively to the mark frequency, the intermediate frequency and the space frequency, the frequency produced at any time being determined jointly by the keying waveform and the waveform taken from the output divider.

9. A system as claimed in claim 6 wherein, for deriving the intermediate frequency the combiner is arranged to produce by addition two different predetermined frequencies integrally related to the mark and space frequencies respectively and control exercised jointly by the keying waveform and by a relatively high frequency derived from the output divider is employed in effect to switch over the combiner at the required times, to alternate at said relatively high frequency and for equal short periods between production of one of said two predetermined frequencies and production of the other.